W. G. HAWLEY.
ROTARY PUMP.
APPLICATION FILED NOV. 26, 1919.
1,362,621.
Patented Dec. 21, 1920.
3 SHEETS—SHEET 3.
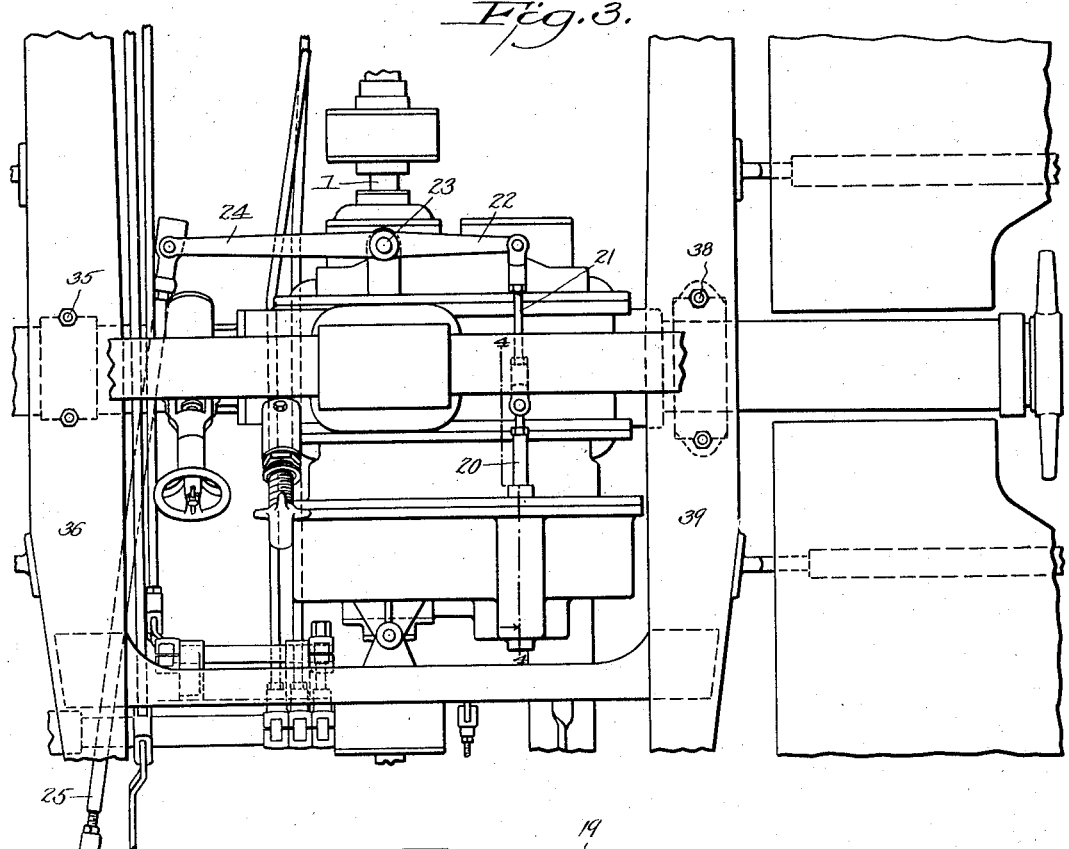
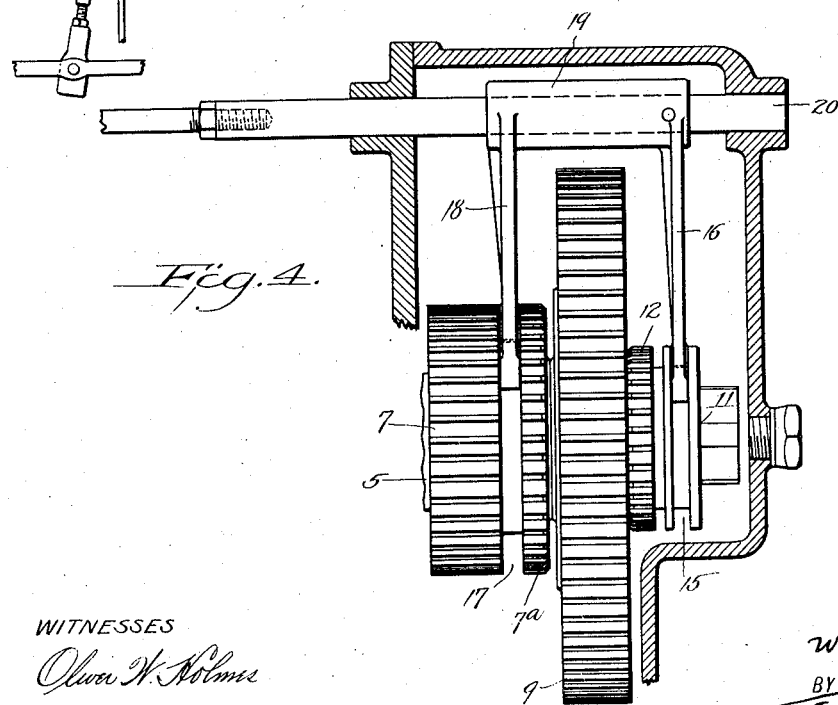
WITNESSES
Oliver N. Holmes
INVENTOR
William G. Hawley
BY
HIS ATTORNEYS

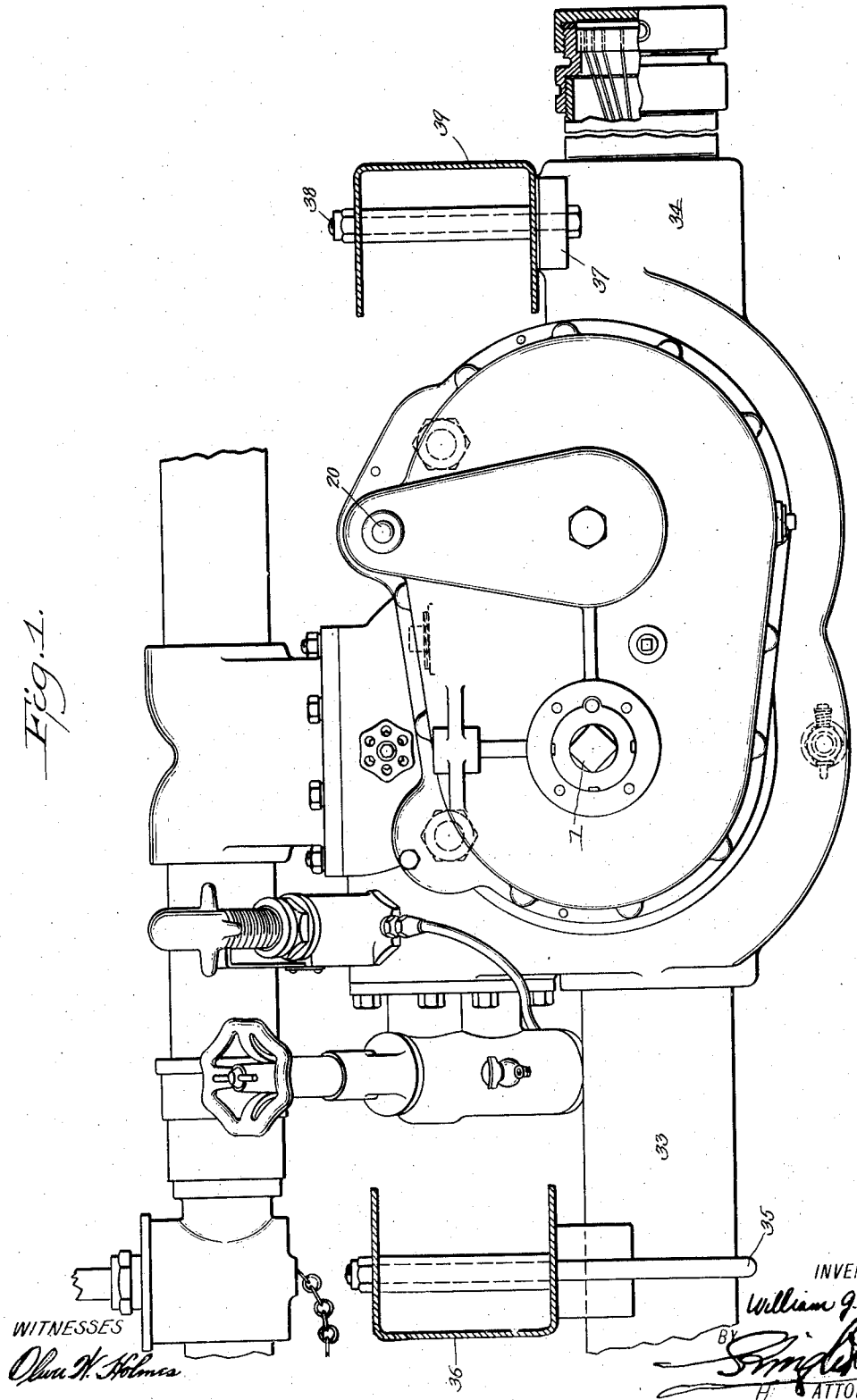

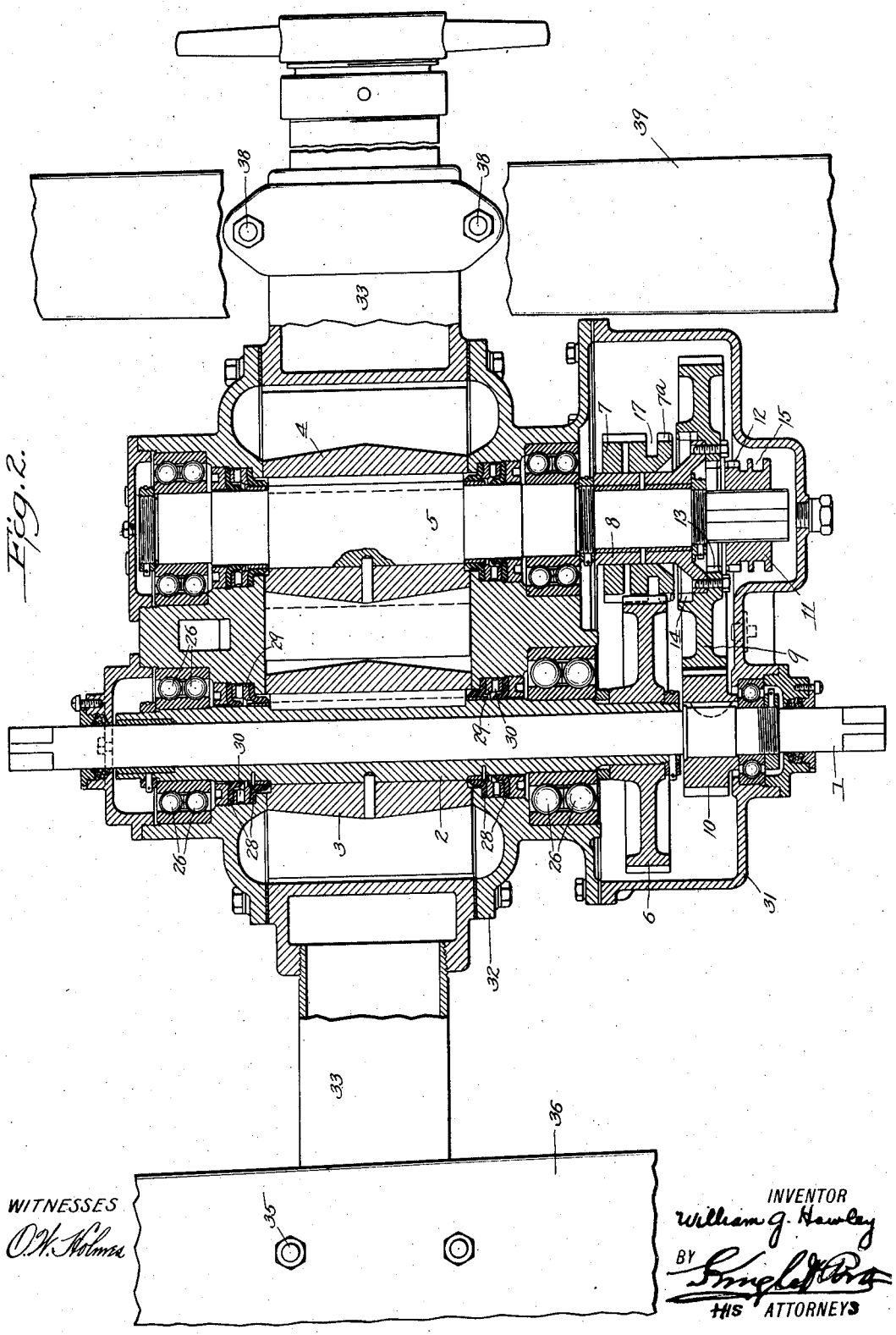

UNITED STATES PATENT OFFICE.

WILLIAM G. HAWLEY, OF ELMIRA, NEW YORK, ASSIGNOR TO AMERICAN LA FRANCE FIRE ENGINE COMPANY, INC., A CORPORATION OF NEW YORK.

ROTARY PUMP.

1,362,621.   Specification of Letters Patent.   Patented Dec. 21, 1920.

Application filed November 26, 1919. Serial No. 340,943.

*To all whom it may concern:*

Be it known that I, WILLIAM G. HAWLEY, a citizen of the United States, and resident of Elmira, county of Chemung, and State of New York, have invented certain new and useful Improvements in Rotary Pumps, of which the following is a specification.

This invention relates more especially to that class of rotary pumps in which the driving power may be applied through either one of the pumping elements. The primary object of the present invention is to provide an improved construction, combination, and arrangement of parts in a combined pump and transmission which may be readily added or removed from the chassis of an automobile without in any way disturbing the road transmission, or parts other than the driving shaft. One of the objects of my invention is to provide an improved transmission for rotary pumps such as that shown and described in Patents Numbers 1,129,090 and 1,129,091 granted in my name on February 23, 1915. Another object is to provide an improved construction and arrangement of parts in a rotary pump transmission whereby the underwriters' requirements of a nominal capacity at 120 pounds, one-half this capacity at 200 pounds and about one-third this capacity at 250 pounds, may be readily and efficiently complied with. Other and further objects will appear in the specification and be pointed out in the appended claims, reference being had to the accompanying drawings in which:

Figure 1 is a front elevation of the rotary pump, parts being broken away and parts shown in section;

Fig. 2 is a horizontal section of the same, parts being shown in plan;

Fig. 3 is a top plan view of the same, parts being broken away;

Fig. 4 is a section on the line 4—4, Fig. 3.

In the embodiment of my invention shown on the drawings, which represent an adaptation of my invention to an automobile fire engine, the shaft section 1 represents a section of the main transmission shaft of the automobile. This shaft section is the only part of the automobile which is disturbed in applying the pump to the automobile or removing it therefrom. The shaft 1 extends through a hollow shaft or sleeve 2 to which is keyed a pumping element 3, said pumping element 3 intermeshing with a similar pumping element 4 which is keyed to a shaft 5. Each of the geared pumping elements is adapted to drive the other or to be driven thereby depending upon which of said elements is rotated by the application of power through the elements to be hereinafter described. Keyed to the hollow shaft or sleeve 2 is a spur gear 6 which meshes with an annular gear comprising a relatively broad section 7 and relatively narrow section 7ª. This gear is reciprocably mounted and freely journaled upon a sleeve or hub portion 8 of a spur gear 9. Keyed to the drive shaft 1 is a spur pinion 10 which meshes with the spur gear 9 and serves to continuously rotate said gear 9 whenever the shaft 1 is rotating. Splined to the outer end of the shaft 5 is a block 11 provided with a gear 12 which is adapted to mesh with an internal gear 13 on the gear 9. Said gear 9 is also provided with a second internal gear 14 which is adapted to mesh with the gear section 7ª. As shown in Fig. 4, the block 11 is provided with an annular groove 15 for the accommodation of a clutch shifting arm 16. The gear 7, 7ª is also provided with an annular groove 17 which accommodates a similar arm 18. Said arms 16 and 18 are mounted upon a hub 19 which is keyed to a reciprocable rod 20, said rod being connected by a rod 21 to an arm 22 of a lever which is fulcrumed at 23 (see Fig. 3). The other arm 24 of said lever is operatably connected to a connecting rod 25 which is operatable at will for shifting the gears 7ª and 12 simultaneously to bring one or the other into geared connection with the gear 9. As shown in Fig. 2, the hollow shaft or sleeve 2 is journaled in ball bearings 26 adjacent either end thereof. Interposed between each of the ball bearings 26 and the pumping element 3 are a pair of flanged lever packings 28. Interposed between each pair of packings 28 is a grooved washer 29 provided with a channel 30 which drains to the lower outside of the case. This feature is designed mainly to prevent any possible leakage past the first packing ring from entering the transmission case. Similar packings are provided for the rotary pumping element 4 as shown in Fig. 2. It will be seen from Fig. 2 that the transmission gearing just described is inclosed in a housing 31 which constitutes substantially an extension of the main pump housing 32. Said pump housing 32 is supported through the intake columns 33, 34, a shackle bolt 35 being passed about the column 33 and secured to side frame 36 of the automobile. The column 34 is provided with a lug or pad 37 which is suspended by a body 38 from the opposite side frame 39. The operation of my improved gear pump and transmission will now be readily understood and briefly described is as follows. With the parts in the positions shown in Fig. 2, the pumping elements 3 and 4 are at rest, the road transmission shaft section 1 being adapted to operate without running the pump. Should it be desired to operate the pump at low speed and high pressure, the gear section 7ᵃ is thrown into mesh with the internal gear 14 of the gear 9, the gear train being then as follows, namely, shaft 1, gear pinion 10, gear 9, sleeve gear 7, 7ᵃ, spur gear 6, hollow shaft or sleeve 2 and pumping elements 3 and 4. Under these conditions, about one-half of the pump's capacity may be pumped at 200 pounds pressure or about one-third of its capacity at a pressure of 250 pounds. If on the other hand it is desired to operate the pump, for example, under a pressure of 120 pounds, the full nominal capacity of the pump is obtainable by throwing the gear 12 into mesh with the internal gear 13. The gear train will then be shaft 1, pinion 10, gear 9, gear block 11, shaft 5 and pumping elements 4 and 3.

I claim:

1. In a gear pump, intermeshing pumping elements adapted to drive and be driven by each other, a power driven gear, a relatively low power connection for driving one of said pumping elements from said power driven gear, and a relatively high power connection for driving the other of said pumping elements from said power driven gear.

2. In a gear pump, intermeshing pumping elements each adapted to drive and to be driven by the other, a gear non-rotatably connected to each of said pumping elements, a power driven gear, and means for operatably connecting said power driven gear to either of the gears which are non-rotatably connected to the pumping elements.

3. In a gear pump, intermeshing pumping elements adapted to drive and be driven by each other, a power driven gear coaxially journaled with respect to one of said pumping elements but rotatable relatively thereto, clutch elements coaxially arranged with respect to said power driven gear and movable alternatively into clutching engagement with said gear, one of said clutch elements being non rotatably connected to one of said pumping elements, and means for gearing the other of said clutch elements to the other pumping element.

4. In a gear pump, intermeshing pumping elements adapted to drive and to be driven by each other, a gear secured to one of said pumping elements, a power driven gear, a freely journaled gear continuously in mesh with the first mentioned gear and movable into and out of driven engagement with said power driven gear, and means non-rotatably connected to the other of said pumping elements and movable into and out of engagement with said power driven gear.

5. In a gear pump, a drive shaft, a driving pinion keyed thereto, a pumping element journaled on said drive shaft, a second shaft, a pumping element keyed thereto and meshing with the first mentioned pumping element, and means for connecting the pinion on said drive shaft to either of said pumping elements.

6. In a rotary pump, a drive shaft, a pinion keyed thereto, a sleeve journaled on said drive shaft, a driven shaft, coöperating pumping elements keyed to said sleeve and driven shaft respectively, a gear keyed to said sleeve, a second sleeve journaled on said driven shaft, a spur gear non-rotatably connected to said second sleeve and meshing with said drive shaft pinion, a gear journaled on said second sleeve and movable into and out of clutching engagement with said non-rotatably connected gear, said gear journaled on the second sleeve being in mesh with the gear keyed to the first mentioned sleeve, a gear splined to said driven shaft and movable into and out of clutching engagement with said non-rotatably connected gear, and means for moving said clutching gears alternatively into and out of clutch with said non-rotatable gear.

7. In a gear pump, a drive shaft, a driving pinion keyed thereto, a gear meshing with said driving pinion, a pair of intermeshing toothed pumping elements, each adapted to drive and to be driven by the other, means for releasably connecting said pinion driven gear to one of said pumping elements, a gear for transmitting power directly to the other of said pumping elements, and means for releasably connecting the last mentioned gear to said pinion driven gear.

WILLIAM G. HAWLEY.